July 9, 1940.  E. A. DERUNGS  2,207,481
AUTOMATIC CONTROL MEANS FOR VEHICLES
Filed March 18, 1937  3 Sheets-Sheet 2
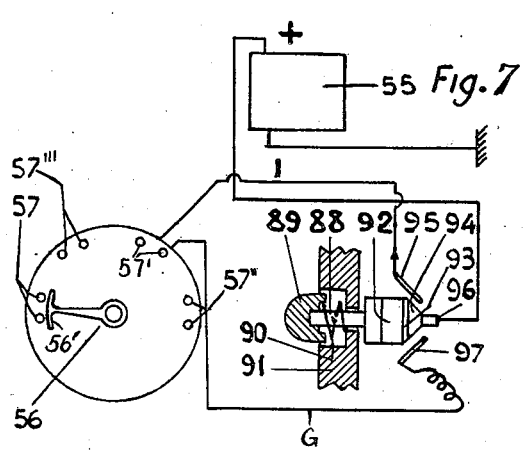
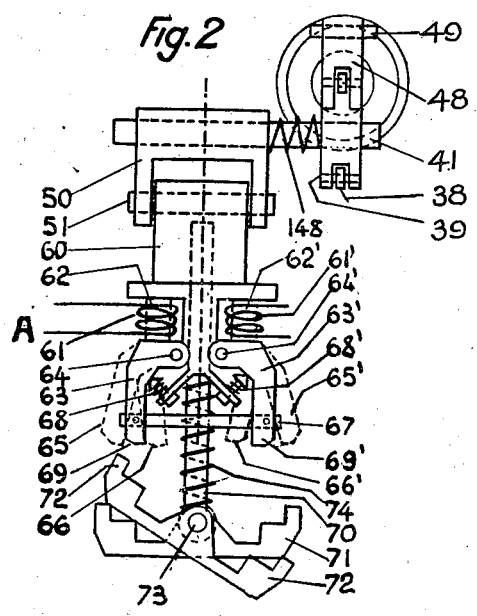
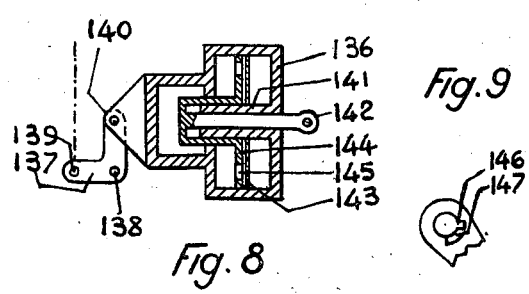
Inventor,
Ernest Alphonse Derungs,
by Frank S. Appleman
attorney

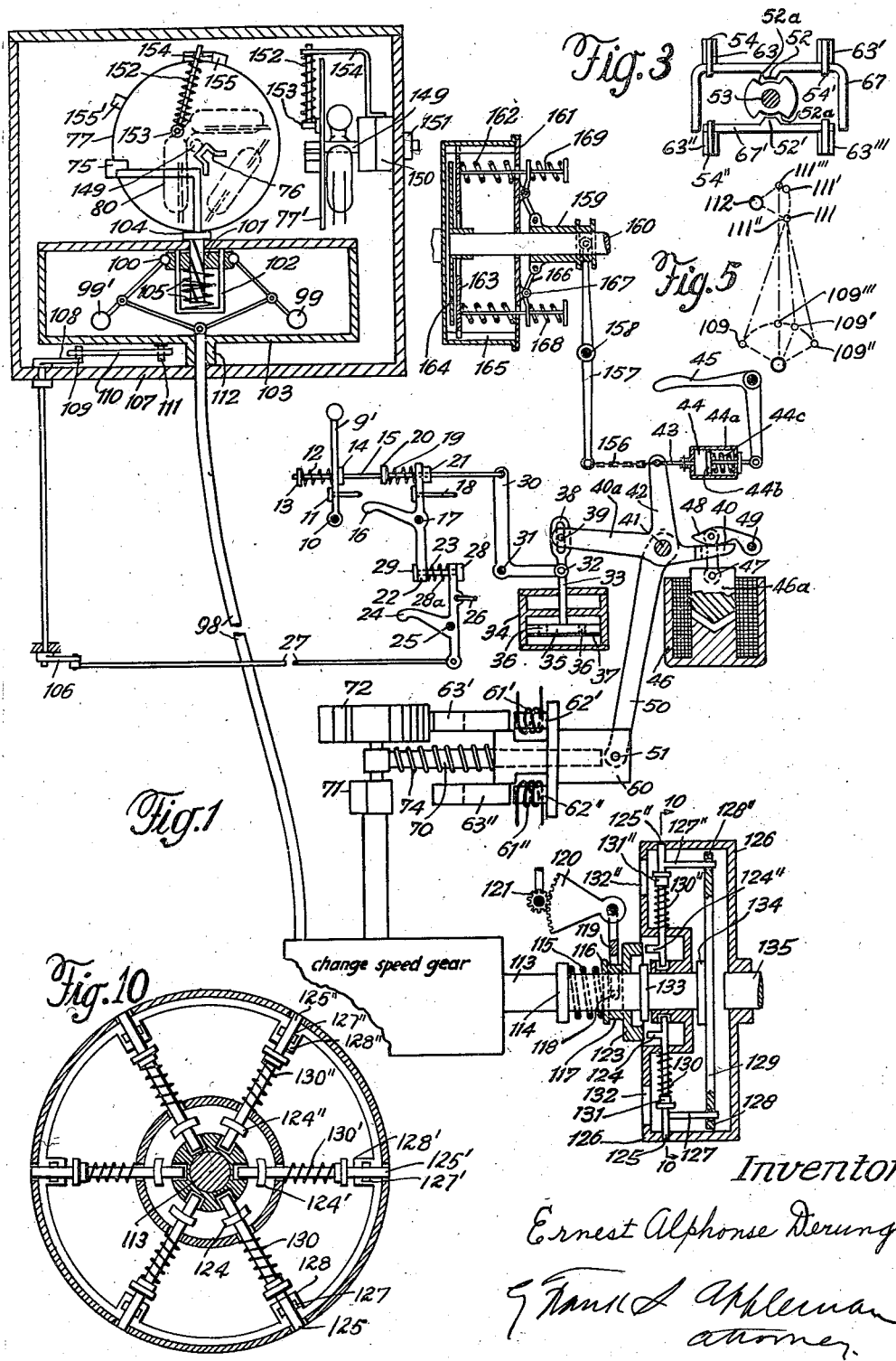

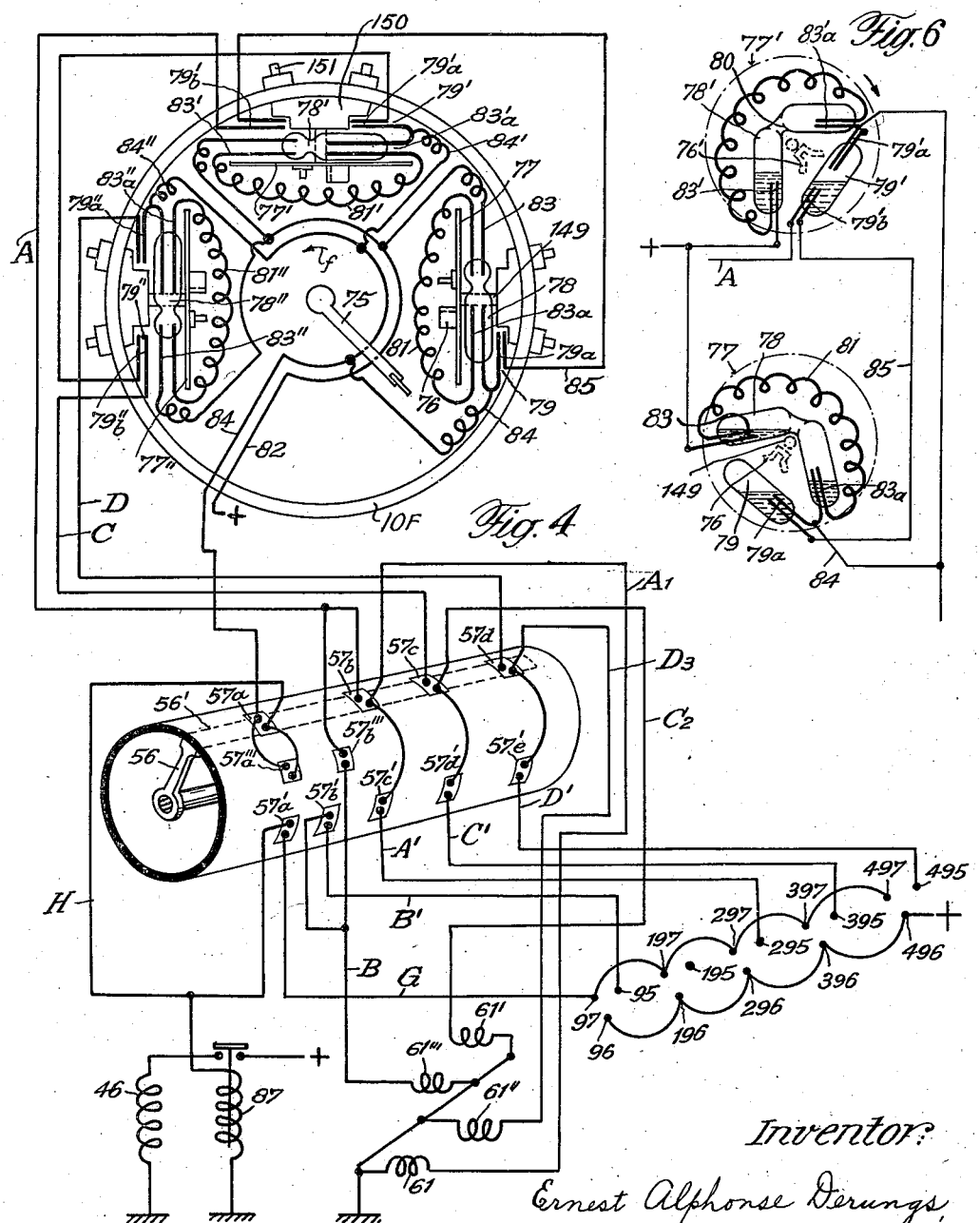

Patented July 9, 1940

2,207,481

UNITED STATES PATENT OFFICE 2,207,481

AUTOMATIC CONTROL MEANS FOR VEHICLES

Ernest Alphonse Derungs, Neuilly-sur-Seine, France

Application March 18, 1937, Serial No. 131,719
In France March 18, 1936

14 Claims. (Cl. 192—.01)

This invention relates to mechanism for controlling automatically a vehicle having a power unit, a variable speed gear, a clutch, one or more brakes and an accelerator or the like for varying the speed of the power unit.

One of the objects of the invention is to provide means for controlling the vehicle whereby the power unit is always working under the most favourable conditions for a given vehicle speed, the appropriate gear ratio being selected and engaged automatically.

Another object is to provide control means wherein automatic control is effected by mechanism actuated by a summing of factors dependent on the speed of the vehicle and on the position of one or more or the normal control levers.

Another object is to provide control means which allow the driver of the vehicle to select by a simple movement of a selector whether he will have the vehicle controlled automatically for forward or reverse driving or whether he will have a semi-automatic control in which changes of gear are effected by pressing an appropriate button.

Another object is to provide automatic control means which effect the shifting of the gears and the taking up of the drive smoothly and without shock to the vehicle occupants.

Yet another object is to provide automatic control means which is positive in action, is not liable to get out of order, and can be incorporated in the design of new vehicles and can readily be adapted to existing vehicles.

A further object is to provide an indicator which demonstrates visibly the torque conditions under which the power unit is operating and enables the driver to see that these conditions are at their most favourable value.

These and other features of my invention will be apparent from the following description with reference to the accompanying diagrammatic drawings illustrating one practical form of the invention.

In these drawings:

Figure 1 is a general diagrammatic view of a control apparatus according to the invention.

Figure 2 is a side elevation of the part of this diagram which has reference to the selector.

Figure 3 is a side view of that part of the selector which effects the locking of the rockers.

Figure 4 is a diagrammatic view of the complete electrical system of the control apparatus.

Figure 5 is a diagrammatic view illustrating the action of the pedals on the automatic control device shown in Figure 1.

Figures 6 and 7 are detail views of the electrical system of the control apparatus.

Figure 8 is an elevation of a modification of the damping device.

Figure 9 is a transverse section showing a modification of the selector shaft.

Figure 10 is a transverse section of the torque controlling device taken on the line 10—10 of Figure 1.

In the embodiment of the invention which is shown in the drawings, the combined devices are shown applied to a motor car comprising inter alia: A synchro-mesh gear box and a clutch of which only the operating levers are shown; an accelerator, a manually-operated braking device and a foot-operated braking device, the said devices being illustrated solely by their operating levers.

As will be clearly seen from Figure 1 of the accompanying drawings, a lever 9' pivotally mounted about a point 10 operates through the medium of a rod 11 a known braking device, and through a spring 12 which is partly compressed between parts 13 and 14, a rod 15 by means of the part 13 which is secured thereto.

A pedal 16 pivotally mounted at 17 operates through the medium of a rod 18 a known braking device and through the medium of a spring 19, which is partly compressed between parts 20 and 21, the rod 15. The levers 16 and 9 are freely slidable on the rod 15.

The end 22 of the pedal 16 exerts a limited pressure through the spring 23 (partly compressed in the same way as the foregoing springs) on the pedal 24 which is pivotally carried at 25 and operates through the rod 26 the engine throttle and through the rod or cable 27 the advancing or retarding of the servo motor, as will be described hereafter.

The end 22 of the pedal 16 slides freely on the rod 28a that connects the parts 28 and 29, whereby a movement of the levers 9 or 16 is transmitted to the pedal 24 only in cases when the latter is not urged in the reverse direction by a force larger than that which compresses the spring 23 between the parts 28 and 29.

The transmission rod 15 is connected to a lever 30 pivotally mounted at 31 and connected at 32 to the piston rod 33 of the dash-pot 34. The end of the rod 33 within the dash-pot cylinder is secured to or integral with a piston 35 formed with holes 36. The latter may be closed in one direction by a thin plate 37 which acts as a valve.

The other end of the rod 33 terminates in a slotted link 38 in which is engaged the trunnion 39 secured to, or formed on, a lug 40a of a cam 40 secured to a shaft 41.

The cam 40 is normally operated by the core 46a of an electro-magnet 46 through a connecting rod 47 and the convex cam 48 which is pivotally mounted on the fixed axis 49 and engages with a flat face of the cam 40.

When for any reason the electromagnet 46 is out of operation, or the driver does not desire to use the electromagnetic control, he can operate the cam 40 by means of an emergency pedal 45 which is coupled to a lug 42 on the cam by the intermediary of a device 44 capable of limiting the effort exerted by the pedal on the cam. This device comprises a slidably mounted sleeve 44a within which can move a piston 44b connected to the pedal. The sleeve 44a is connected to the lug 42 by means of a rod 43. A spring 44c provided with initial tension is inserted between the piston 44b and one end of the sleeve.

The lug 42 is connected by means of a flexible member 156 to a lever 157 pivotally mounted at 158 and engaging a clutch operating sleeve 159 slidably mounted on the driven shaft 160 of a clutch 161 which can be of any known design and which is diagrammatically illustrated by way of example only. Springs 162 produce engagement of friction discs 163 and 164, the disc 163 engaging the driving member 165 of the clutch, while the disc 164 is secured to the driven shaft 160. It is seen that actuation of the pedal 45 or attraction of the magnet core 46a produces a clockwise rotation of the lug 42 which actuates the lever 157 so as to move the sleeve 159 towards the clutch. Levers 166 connected to the sleeve and pivotally mounted at 167 then produce compression of springs 168 which act on rods 169 connected to the friction disc 163, and after sufficient compression of the springs 168, the rods 169 and the disc 163 will move axially away from the disc 164 against the action of the springs 162 and the clutch is disengaged. When the pedal 45 is released, or the electromagnet 46 deenergized, the springs 162 will produce engagement of the clutch. It is also evident from Figure 1, that when the brake lever 9' is pulled to produce a movement of the lever 30 in counterclockwise direction, the rod 33 moving upwardly, will produce a movement of the lug 42 in clockwise direction, and the clutch 161 will be disengaged.

The shaft 41 has secured thereto a lever 50 whose free extremity 51 is coupled to the frame 60 which carries a plurality of energising coils 61 and 61', of the magnet cores 62 and 62', which in turn, on being energized, cause rotation of the rockers 63, 63', about the axes 64 and 64', (Figure 2) to the positions shown at 65 and 65', in dotted lines when there is a direct drag and to the positions shown at 66 and 66', when the drag is transmitted thereto through the medium of the rod 67.

When the rockers 63 and 63' are not urged by the electromagnets 62 and 62', they are held in the neutral position which is shown in full lines by means of stops 68 and 68', including adjustable springs 68a.

The rockers 63, 63', terminate at 69 and 69' in the form of plane faces which are substantially tangential at such points to a circle the centre of which coincides with the axes 64 and 64'.

When a gear is to be engaged, the corresponding lever 63 or 63' assumes the position shown at 65 or 65'; the frame 60 is advanced along the guide 70 and pushes one end of the lever 72 secured to the mechanism which is adapted for the engagement of the various gears. The lever 72, when swinging about the point 73, comes to the tilted position shown in Fig. 2 of the drawings.

Therefore the other end 72' of the lever 72 assumes a position parallel to the face 69 and in the path of the opposite rocker 63' at its point of equilibrium. Consequently, when the frame 60 is advanced further, the lever 72 resumes a position similar to 71 by pivoting about the point 73 anti-clockwise until the said face 69 escapes from the end 72' due to the rotation which moves the latter away from the rectilinear path of the rocker 63'.

The return to the neutral position from an engaged position is therefore insured when the rockers 63, 63' are in inoperative position; it is also ensured when these rockers occupy the position 65 and 65' which corresponds to the bringing into gear of another speed.

In each case, the gear which has been in engagement is disengaged before another gear is engaged.

The frame 60 is returned to its initial position by the spring 74.

The guide 70 is connected to the shaft 73 by such means as will leave to it sufficient play to enable it to adapt itself to the part-circular path described by the end of the lever 50.

In Figure 3 is shown in side view a mechanical locking device in which the rockers 63, 63', are connected by a bar 67 and the rockers 63" and 63'" by a bar 67'. Each of these bars carries intermediate its ends a tooth or dog 52, 52'. These dogs engage between a pair of grooves 52a the widths of which are greater than those of the dogs; such grooves 52a are formed on the diametrically opposed faces of a cylindrical ring or bush 53 which is mounted for free rotation on the guide 70.

Furthermore, the bar 67 is bent at both ends so as to hold the bar 67' while allowing a clearance corresponding to that existing between the dogs 52, 52' and the bush 53; the rods 54, 54', 54" and 54'" which connect the bars 67, 67' to the rockers 63, 63', 63" and 63'" form articulated joints.

Whenever a rocker 63, 63', 63" and 63'" assumes the position 65 or 65', it operates one of the bars 67 or 67' and consequently the oppositely located rocker but, at the same time, the said bar 67 or 67' is forced, on the one hand, against the end of the second bar which connects the other pair of rockers and on the other hand, causes a slight rotation of the ring 53 which brings the side of the other groove 52a into contact with the dog of the other bar and thereby locks the second bar in the reverse direction.

In the diagram shown in Figure 7 there is shown any suitable form of electric current source 55 which feeds the energizing circuits for the several operating electromagnets.

The frame 107 of the automatic control device (Figs. 1, 4 and 6) has mounted thereon three carriers 77, 77', 77" carrying each two mercury tubes 78, 79; 78', 79' and 78", 79", respectively, and being rotatable about axes 149 carried in bearings 150 which are screwed to the frame 107 by screws 151. Each carrier comprises a cam member 76, 76' and 76", respectively, capable of engagement with a control finger 75, which is rotated angularly in a manner described hereinafter. When this finger rotates in the direction of the arrow f in Fig. 4, it engages first the cam 76 of the carrier 77 and causes a rotation of this carrier through substantially 90°; further movement of the finger produces likewise a rotation of the carriers 77' and 77". Before such rotation, the carriers are in a position in which there is represented the carrier 77' in Fig. 6, in which position mercury is present in the lower pocket of the tube 78' only. Upon engagement of the cam 76' by the finger 75, the carrier 77' is rotated in the direction of the arrow and mercury from one of the pockets of the tube flows through the throttled portion 80 of the tube into the other pocket, as is represented for the tube 78 in Fig. 6, until the pocket which formerly was filled with mercury is empty. Each pocket of the tubes 78, 78' and 78" contains two electrodes 83, 83a; 83', 83'a and 83", 83"a. In the two final positions of rotary movement of the tubes, only one or the other pair of electrodes of each tube is electrically connected by the mercury, while during the movement of rotation of a carrier, as shown for the tube 78 in Fig. 6, mercury is present in both pockets and consequently both pairs of electrodes are electrically connected.

The mercury tube 79 on the carrier 77 contains one pair of electrodes 79a disposed at one end of the tube, while the two tubes 79' and 79" contain each two pairs of electrodes 79'a, 79'b and 79"a, 79"b, respectively, each pair being disposed at one end of the tube.

Each carrier 77, 77' and 77" is held in one or the other of its two angular positions by means of a spring 152 having one end abutting against a fixed bracket 154 and the other end against an eccentric button 153 on the carriers. During rotation of a carrier, this spring is thus compressed in the first half of the movement of rotation, and after its point of maximum compression has been reached, the finger 75 releases the cam 76 of the corresponding carrier and the compression of the spring then causes the carrier to turn to its terminal position of rotation. Stops 155 and 155' are provided for limiting the angular movement of the carriers by abutting against a bracket 154. The weights carried by the carrier 77 are so arranged that the center of gravity of the carrier coincides as accurately as possible with the pivot 149 so that the effects of inertia due to extraneous causes will not affect the carrier 77.

The movement of the finger 75 is produced partly by a rotating shaft 98 driven from the usual flexible cable which drives the mileage meter and speedometer. The shaft 98 in the present construction, causes motion through the centrifugal weights 99, 99' of the crown or ring 100 which can rotate freely about the collar 101 so as to shift the latter along guides 102 connected to the frame 103.

The spindle 104 which is rigid with the finger 75 can rotate in the frame 103 when its screw-threaded end, engaged in the collar 101, is acted upon by a rotational torque due to the axial movement of the said collar.

The screw-thread on the spindle 104 is of such a pitch as to ensure that the movement shall be irreversible.

By the same means the movements of the frame 103 are transmitted by the guides 102, the collar 101 and the elongated screw-threaded portion of the spindle 104 and the pointer 75, no matter what the position or the movements imparted to the collar 101 by the centrifugal device may be, and the position of the finger 75 at any moment represents the sum of the angular movement produced by the axial movement of the collar or nut member 101 and the angular movement of the guides 102.

The displacement reaction of the collar 101 under the action of the centrifugal weights is ensured by two or more springs 105 having gradually increasing strength arranged within the guides 102 about the spindle 104 so as to increase the sensitiveness of the action of the centrifugal weights 99 and 99' when starting the vehicle.

The movement of the levers 9', 16 and 24 is transmitted as described above to the rod or cable 27 which is connected to the crank 108 rotatably supported in the frame 107 which carries the servo motor unit.

The crank 106 is connected to another crank 108, the pin 109 of which is shown in Figure 5. A link 110 connects the crank pin 109 to a trunnion 111 connected to the frame 103, which is supported by a boss 112 rotatably mounted on the shaft 98.

When the brake is applied, the pin 109 assumes the position 109" which corresponds to the position 111" of the trunnion that operates the frame 103. When conversely the brake is released, the pin 109 assumes the position 109' to which corresponds the position 111' of the trunnion. When the accelerator comprising the pedal 24 is actuated the crank pin 109 moves from 109' to 109'''. This corresponds to the position 111'''' of the trunnion. Thereafter, as the acclerator is moved further, the crank pin moves towards the position 109 which corresponds to maximum acceleration and to the position 111 of the trunnion which is substantially the same as the position 111" as determined by the applied brake position.

It follows from the foregoing that the continuous movement of the crank pin 109 in one of its circular strokes is transmitted by the link 110 and converted thereby into a reciprocating movement of the trunnion 111.

The purpose of this arrangement is, on the one hand, to cause the finger 75 to recede with respect to the position assumed thereby under the action of the centrifugal weights at each operation of the brakes and, on the other hand, to cause the operation of the accelerator first to produce a slight positive movement ensuring engagement of the first speed and afterwards a negative movement i. e. reverse to that imparted to the finger 75 by the centrifugal weights, whereby a high pressure on the accelerator pedal tends to produce the speed combination which always ensures the maximum kinetic torque which is compatible with the speed at which the vehicle is running.

The braking effect by the engine is also obtained in a completely automatic way, due regard being paid to the manner in which this method of slowing down the vehicle may be used considering the speed at which it is running. This effect is due to the fact that the points 109 and 109" both correspond substantially with the position of the trunnion 111.

However, when a very slight acceleration is given to the vehicle, the pin 109''' corresponds precisely with the position 111'''' of the trunnion i. e. with the position wherefor the highest gear and the lowest engine speed compatible with the speed of the vehicle are in use.

In order to adapt the aforesaid device to a vehicle having predetermined characteristics, it is only sufficient to adjust slightly the radius of the crank pin 109 and the radius of the trunnion 111.

Where it is necessary to have a powerful starting torque capable of overcoming a braking resistance, it should be noted that the conjunction of the pedals 24 and 16 and 9' makes it possible simultaneously to apply the brakes and to depress the accelerator pedal by compressing the spring 23, as described above.

For semi-automatic control of the vehicle, the circuits energizing the electromagnet 46 and the four coils 61, 61', 61'' and 61''' are closed by means of push-buttons 89. There is provided one push-button for each of the circuits of the four coils, and a fifth button for closing a circuit which ensures neutral position of the change speed gear.

As all the speed controlling buttons are the same, only one of them is illustrated in Fig. 7. This button comprises a shank 88 carrying the cap which is urged outwardly by a spring 90 inserted between the cap and a supporting plate 91. The other end of the shank 88 is provided with a contact portion 92, an insulating washer 93, and a second conical contact portion 94. The contact portions 92 and 94 are arranged to cooperate with three resilient contact blades 95, 96 and 97 disposed in the shape of a cone around the inner conical end of the contact button.

The contact blade 96 is connected to the positive pole of the source of current, the blade 97 is disposed in the circuit of a relay 87, and the blade 95 is disposed in the circuit of one of the coils of the magnet cores of the change speed gear operating mechanism.

When the button is pressed down, the conical contact portion 94 thereof first establishes a connection between the blades 95 and 96, the third contact blade 97 being disposed at a slightly greater radial distance from the axis of the button, and makes contact a moment later only with the contact portion 94. The magnet coil of the selector is accordingly energized a moment before the energisation of the relay 87 which closes the circuit of the electromagnet 46 driving the frame 60. When the button 89 is moved further until the end of its stroke, the insulating washer 93 makes contact with the three blades 95, 96, 97 and cuts the connections for a short moment, but immediately afterwards the two circuits are again closed by the contact portion 92. The reason for closing twice the circuit is to make sure that the frame 60 has advanced sufficiently to effect the movement of one of the levers 72 into gear engaging position by the operative rocker, even if the vehicle driver actuates the button for a short moment only; the lever 72 is thus struck twice by the rocker and will be moved to the end of its stroke by the second hit, if the first one would not have produced a complete engagement of the gears. The conical end of the button is provided to prevent contact from being made for a third time when the button returns to its position of rest, since the resilient blades do not spring back quick enough to make contact with the portion 94 on the return stroke of the button.

The three contact blades of each of the five push-buttons 89 are diagrammatically represented in Fig. 4. The contact blades 96, 196, 296, 396 and 496 are connected to each other and to the positive pole of the current supply. The contact blades 97, 197, 297, 397 and 497 are connected to each other and disposed in the circuit of the relay 87. The contact blades 95, 295, 395 and 495 are each disposed in one of the circuits of the coils 61''', 61, 61' and 61'', respectively, while the contact blade 195 is not connected and corresponds to that push-button which is used to establish neutral position of the change speed gear.

In order to change from automatic control of the vehicle to semi-automatic control, a commutator (Figs. 4 and 7) is provided comprising a movable handle 56 carrying a contact bar 56' and stationary rows of contacts 57, 57' and 57'''. The row of contacts 57 comprises four pairs of insulatedly mounted contacts 57a, 57b, 57c and 57d. The row of contacts 57' comprises five pairs of insulatedly mounted contacts 57'a, 57'b, 57'c, 57'd and 57'e. The row of contacts 57''' comprises two pairs of insulatedly mounted contacts 57'''a and 57'''b. The contact bar 56' can be brought to one or the other of the three rows of contacts, and when it extends along one row of contacts, it electrically connects the two contacts of each pair of contacts of the row, while the various pairs themselves remain insulated one from the other. The contact bar can assume a fourth or neutral position in which it is yieldingly maintained by members 57'' (Fig. 7) and in which position it does not establish any electrical circuit.

The torque indicator shown in Figures 1 and 10 is arranged as follows. The shaft of the engine 113 carries a collar 114 against which abuts a spring 115 applying axial pressure to the ring 116 which can rotate freely about the shaft 113 and which carries the slide 117 which receives the fork 118 adapted to actuate the lever 119 connected to the sector 120 which meshes with the pinion 121 and drives the flexible cable 122 operating the pointer of an indicator.

The ring 115 terminates at 123 in the form of a crown which takes the thrust of the cams 124, 124', 124'' etc. connected to the shafts 125, 125', 125'' etc. which are mounted for pivotal motion, as shown, on the supporting wheel 126 and are provided with operating levers 127, 127', 127'' etc. driven in turn through the medium of notches 128, 128', 128'' etc. formed in the disc 129 connected to the engine shaft 113. The shafts 125, 125', 125'', etc. are held in their initial positions by the springs 130, 130', 130'', etc. the tension of which is adjusted by the heads 131, 131', 131'', etc. accessible through the apertures 132, 132', 132'', etc. The supporting wheel 126 is held on the driving shaft intermediate the rings 133 and 134 and is keyed to the driven shaft 135.

Figure 8 shows at 136 a modification of the dash-pot 34 which is suitable for use when the lever 137 pivotally supported at 138 and coupled to the clutch mechanism is connected at 139 to the operating rod or cable 15.

The body of the dash-pot is secured at 140 to the lever 137 and is extended at 141 along the rod 142, one end of which is attached to a stationary point while its opposite end terminates, as shown, in a bell-shaped piston 114, the flaring portion of which is formed with apertures 145 which can be closed by the valve disc 143. The purpose of such apertures is to ensure quick return motion in one direction.

Figure 9 shows a modification for the attachment of the lever 50 to the shaft 41 in case, through pressure exercised on the gearing by an oblique position of the vehicle, it is necessary to de-clutch fully before being able to operate the change speed gear.

In this modification the key 146 carried by the shaft 41 can, in case of a normal resistance exerted on the lever 50, describe an arc inside the groove 147 while compressing the spring 148 which constantly tends to hold the said lever locked in the position shown in Figure 9, i. e. clockwise.

The operation of the described control apparatus is as follows:

When it is desired to have the vehicle controlled automatically, the handle 56 is turned to the position in which the contact bar 56' connects with each other the two contacts of each pair of contacts 57a, 57b, 57c, and 57d, corresponding to the automatic forward drive.

Supposing the vehicle is not running and the motor will be started, the crank pin 109, which is connected to the accelerator pedal 24, moves from its position 109' to the position 109''' (Fig. 5). This movement of the crank pin produces a movement of the trunnion 111 of the frame 103 from the position 111' to the position 111''', and the corresponding rotation of the frame causes the pointer 75 to move from its position of rest shown in Fig. 4 in the direction of the arrow f towards the cam 76 of the carrier 77, and when it strikes against the cam, it makes the carrier turn about its pivot 149 allowing the mercury to flow from one of the chambers of the tube of the switch 78 to the other chamber. During the rocking movement of the carrier 77, there is accordingly mercury present in both chambers of this tube. As soon as the rocking movement begins, the mercury present in the tube 79 flows to the electrodes 79a of this tube. As long as mercury is present in both chambers of the tube 78, the following circuits are established:

Positive pole of the current supply, lead 82, electrodes 83, connection 81, electrodes 83a, electrodes 79a of switch 79, connection 85, electrodes 79'b of switch 79', connection A, contacts 57b, connection A₁, coil 61 corresponding to the rocker 63 of the first speed, and then to the ground. Simultaneously the current flows through lead 84, contacts 57a, lead H, relay 87, ground. The relay closes the circuit of electro-magnet 46, which when energized causes the advance of the frame 60.

When the rocker 63 has assumed the position 65 and when the electro-magnet 46 actuates the cam 48 through the link 47, the cam rolls along the surface of the cam 40 and causes the cam 40 to rotate under an almost constant torque due to the continuous change of the ratio of the lever arms, which propels the frame 60 and disengages the main clutch and sets the dash-pot 34 through the rod 33.

These various actions cause rocking of the lever 72 in the manner described above, which brings into gear the first speed.

At the end of the rocking movement of the carrier 77, mercury is present in one of the chambers of the switch 78 only, and the above mentioned circuits are cut, whereupon the spring 74 returns the frame 60 to its initial position, and simultaneously the electro-magnet 46 resumes its position since, as the trunnion 39 can slide in the slot 38, the dash-pot which retards the return motion of the rod 33 does not affect the electro-magnet.

However, owing to the retarding action exerted by the dash-pot 34 on its attachment point 32, tne clutch-operating lever 30 resumes its position slowly, thereby avoiding shocks and jerks when starting the vehicle.

It has been seen that the rocking movement of the carrier 77 and accordingly of the switch 79 has closed at the electrodes 79a, the electric circuit of the coil 61 corresponding to first speed of the vehicle, and that the electrodes 79'b of the switch 79' are connected in this circuit. When the speed of the vehicle increases, the pointer 75, moving now in accordance with the speed of the vehicle and the movement imparted to the accelerator, continues to rotate, while the carrier 77 remains in its position in which the above defined circuits are not energized any more because mercury is present in one of the pockets of the tube 78 only.

When the pointer 75 engages with the cam 76' of the carrier 77', it will rock this carrier in the same manner as the carrier 77 was rocked, and this rocking movement causes establishment of the second speed of the vehicle owing to reversal of the position of the switch 79'.

The two electrodes 79a, which are included in the circuit of the coil 61, remain connected by the mercury in the switch 79. Since the electrodes 83a are connected to the electrodes 79a and to the lead 84 which is also connected to the electrodes 83'a and 83''a, the circuit of coil 61 would be excited again as soon as, owing to rocking of the carrier 77' for the purpose of establishing second speed, the lead 84 again receives current. In order to avoid energization of the coil 61 during establishment of second speed, for which the coil 61' must be energized, the switch 79' has been provided on the carrier 77'. Before this carrier is rocked (Fig. 6) the electrodes 79'b in the circuit of coil 61 are connected by the mercury of the switch 79'. Rocking movement of the carrier 77' causes the mercury of the switch 79' to flow to the electrodes 79'a, while abandoning the electrodes 79'b and consequently breaking the circuit of coil 61. At the same time the mercury in the tube 78' flows from one of its pockets to the other pocket and as long as mercury is present in both pockets, the following circuits are established:

Positive pole of current supply, lead 82, electrodes 83' of switch 78', connection 81', electrodes 83'a, electrodes 79'a of switch 79', connection 86, electrodes 79''b of switch 79'', connection C, contacts 57c, connection C₂, coil 61' corresponding to the rocker 63' of the second speed, and ground. Simultaneously the current flows through leads 84', 84, contacts 57a, lead H, relay 87, ground. The relay 87 again closes the circuit of the electro-magnet 46 which causes the advance of the frame 60 and establishes second speed.

In addition, a contact (not shown) on the carrier 77' fed by the current which flows through the switch 78' temporarily energizes a device which cuts off the ignition or so reduces the fuel supply as to slow down the engine to bring it substantially in synchronism with the gear to be engaged.

It has been seen that the circuit of coil 61', corresponding to second speed of the vehicle, has been established by the intermediary of the electrodes 79'a of the switch 79' and the electrodes 79''b of the switch 79''. This switch 79'' serves to cut the circuit of coil 61' before the coil 61'' corresponding to third speed, becomes excited owing to a rocking movement of the carrier 77".

When the pointer 75 continues to rotate, the carrier 77' is released and remains in its position, cutting the above circuit, and the carrier 77" is rocked. The following circuit is then established:

Positive pole of the current supply, electrodes 83" of switch 78", connection 81", electrodes 83"a, electrodes 79"a of switch 79", connection D, contacts 57d, connection D₃, coil 61" attracting the rocker 63" corresponding to third speed, ground. Simultaneously the circuit of the relay 87 is again established by the connections 84", 84, contacts 57a, and lead H. The electromagnet 46 is energized and causes the advance of frame 60, whereby the rocker 63" establishes third speed.

The pointer 75 can still move slightly further to its final position corresponding to maximum speed of the vehicle, while abandoning the carrier 77" which remains in its rocked position in which the mercury of the tube 78" is only present in the pocket containing the electrodes 83"a and the mercury of the switch 79" connects the electrodes 79"a.

If the speed of the vehicle is reduced the carriers are rotated in the opposite direction and the various circuits are established in the reverse order. However, when shifting from third to second speed and from second to first speed, two additional contact studs connected respectively to each of the carriers 77" and 77' and fed in turn by the mercury switches of these groups energize a device (not shown) which controls the throttle valve so as to speed up the engine and bring it substantially into synchronism with the next gear.

When the pointer 75, returning in clockwise direction, again engages the cam 76" and rocks the carrier 77" in the opposite direction, the tube 78", during the passage of the mercury from one of its pockets to the other pocket establishes the circuit of the relay 87 as described above. However, at the beginning of the rocking movement, the mercury of the switch 79" flowing to the electrodes 79"b, cuts off the connection between the electrodes 83"a and 79"a and establishes the circuit of coil 61' corresponding to second speed, since the electrodes 83'a and 79'a, in the actual position of the carrier 77' are connected by the mercury. The following circuits are established:

First, positive pole of the current supply, lead 82, electrodes 83", conductor 81", electrodes 83"a, leads 84", 84, contacts 57a, lead H, relay 87, ground.

Second, leads 84, 84', electrodes 79'a, electrodes 79"b, connection C, contacts 57c, connection C₂, coil 61', ground.

After completion of the rocking movement of the carrier 77" the above circuits are interrupted, since mercury is present in one of the pockets of the tube 78" only.

Upon further reduction of the speed of the vehicle, the pointer 75 rocks the carrier 77' back to the position shown in Fig. 6 to establish first speed. During rocking movement, of the carrier 77', mercury flows from one of the pockets of the tube 78' to the other pocket and the electrodes of both pairs 83' and 83'a are connected with each other. The relay 87 is again energized by the circuit established through lead 82, electrodes 83', conductor 81', electrodes 83'a and leads 84' and 84; further the coil 61, corresponding to first speed, is energized through lead 84, electrodes 79a of the switch 79 which are electrically connected by the mercury, connection 85, electrodes 79'b, lead A, contacts 57b and connection A₁. At the end of the rocking movement these circuits are interrupted; a further reduction of speed to stop the vehicle results in the pointer 75 engaging the cam 76 and rocking the carrier 77 back to its original position. The mercury of the switch 79 flows to that end of the tube containing no electrodes. The mercury in the tube 87 flows from one of the pockets of this tube to the other pocket, so that both pairs of electrodes 83 and 83a are electrically connected. The relay 87 is energized as long as mercury is present in both pockets, while the switch 79 has cut off the connection to the coil 61.

It will be seen that the frame 60 is thus driven along the guide 70 while no rocker 63, 63' etc. is energized and therefore both levers 71 and 72 are returned to the neutral position before complete stoppage of the vehicle.

In order to obtain reverse speed of the vehicle, the handle 56 is turned to bring the contact bar 56' to the row of contacts 57'''a and 57'''b. When now the pointer 75 rocks the carrier 77, the two switches 78 and 79 establish the same contacts as above described with reference to first speed, but the lead A then brings current to the contacts 57'''b and from there to the lead B energizing the coil 61''' corresponding to reverse speed. The relay 87 is energized through connection 84 and lead H as above described.

In order to obtain semi-automatic control of the vehicle, the contact bar 56' is brought to the row of contacts 57'a, 57'b, 57'c, 57'd and 57'e. The speed of the vehicle is then controlled by the five speed controlling buttons 89.

For obtaining first speed the button corresponding to the contact strips 295, 296, 297 is pressed down. The following circuits are then established:

First, positive pole of the current supply, contact strip 296, contact 295, connection A', contacts 57'c, one of the contacts 57b, lead A₁, coil 61 corresponding to first speed, and ground.

Second, positive pole, contact strip 296, contact 297, connection G, contacts 57'a, relay 87, ground. Energization of the relay 87 closes the circuit of the electromagnet 46.

In analogous manner, when the buttons corresponding to the contact strips 395, 396, 397 or 495, 496, 497 are pressed down, second or third speed is established through the connections C' or D'. Pressing the button which corresponds to the contact strips 95, 96, 97 causes establishment of reverse speed through the connection B'. When pressing down the button corresponding to the contact strips 195, 196, 197 neutral position of the change speed gear is established since the contact 195 is not connected and none of the coils 61, 61', 61" or 61'''' is excited. Contact between contact strips 196 and 197 produces energization of the electro-magnet 46, and the frame 60 advances while all the rockers 63, 63', 63" and 63''' are in inactive position, so that the speed which has been in gear is released and no other speed is established.

I claim:

1. Control means for a vehicle having a power unit with a lever controlling the speed thereof and a transmission including a clutch and variable speed gear comprising a screw-threaded member working through a complementarily threaded nut member which is moved axially with respect to the screw-threaded member by centrifugal masses driven at a speed proportional to the vehicle speed, said nut member working in guides which are moved angularly in accordance with the position of the lever controlling the speed of the power unit, a finger moving with said screw-threaded member, and relays energized selectively by said finger according to its position, said relays automatically selecting and engaging an appropriate gear in the transmission and also causing operation of the clutch.

2. Control means for a vehicle having a power unit with a lever controlling the speed thereof and a transmission including a clutch and change-speed gearing and at least one brake with levers for operating the clutch and brake, comprising a control member whose position is responsive to the vehicle speed and to the position of one of said levers, yielding means interconnecting said levers, and means actuated through said control member for automatically operating the clutch and shifting the gears to maintain the operation of the power unit at optimum value under all conditions.

3. Control means for a vehicle having a power unit with a lever controlling the speed thereof and a transmission including a clutch and change-speed gearing, comprising a control member whose position is responsive to the vehicle speed and to the position of said lever controlling the speed of the power unit, means actuated through said control member for automatically operating the clutch and shifting the gears, and a torque indicator located in the drive from the power unit to show the torque being transmitted through the drive.

4. Control means for a vehicle having a power unit with a lever controlling the speed thereof and a transmission including a clutch and change-speed gearing, comprising electro-magnets adapted to operate the clutch and to select and shift the gears, electrical circuits connecting said electro-magnets to a source of electric current, switches in said circuits operated by push buttons, a control member whose position is responsive to the vehicle speed and to the position of the lever controlling the speed of the power unit, further switches in said circuits adapted to be opened and closed selectively by said control member according to its position, and a selector adapted to connect either set of switches into said circuits and to cut the other set out of said circuits at the will of the operator.

5. Control means for a vehicle having a power unit with a lever controlling the speed thereof and a transmission including a clutch and change-speed gearing, comprising a control member whose position is responsive to the vehicle speed and to the position of said lever controlling the speed of the power unit, means actuated through said control member for automatically operating the clutch and shifting the gears, and further over-riding manually operated means acting through a resilient device for operating the clutch and shifting the gears.

6. In control means for a vehicle having a power unit, a clutch and a change speed mechanism, electromagnetic means for operating the clutch and for producing a change of gears in the change speed mechanism, a movable control member adapted to control the circuits of said electromagnetic means, centrifugal masses driven at a speed proportional to the vehicle speed, said centrifugal masses being operatively connected to said control member to move said member to a position dependent on the vehicle speed, and an accelerator member operatively connected to said control member, whereby the position of said control member is determined by the combined movements imparted to said member by said centrifugal masses and by said accelerator member.

7. In control means for a vehicle having a power unit, a clutch and a change speed mechanism, electromagnetic means for operating the clutch and for producing a change of gears in the change speed mechanism, a movable control member controlling the circuits of said electro-magnetic means, a screw-threaded spindle connected to said control member, centrifugal masses driven at a speed proportional to the vehicle speed and operatively connected to said screw-threaded spindle to angularly move said spindle and said control member to a position dependent on the vehicle speed, and an accelerator member operatively connected to said screw-threaded spindle, whereby the position of said control member is determined by the combined movements imparted to said member by said centrifugal masses and by said accelerator member.

8. In control means for a vehicle having a power unit, a clutch and a change speed mechanism, a control member for controlling the operation of said clutch and of said change speed mechanism, a screw-threaded spindle connected to said control member, centrifugal masses driven at a speed proportional to the vehicle speed and operatively connected to said screw-threaded spindle to angularly move said spindle and said control member to a position dependent on the vehicle speed, an accelerator member operatively connected to said screw-threaded spindle, whereby the position of said control member is determined by the combined angular movements imparted to said member by said centrifugal masses and by said accelerator member, gear shift members operative to effect the passage from one speed ratio to another, a plurality of electromagnets for selecting and actuating said gear shift members, an electromagnet for operating said clutch, an electric circuit for each of said electromagnets, and switches disposed in said circuits and adapted to be selectively actuated in accordance with the angular position of said control member.

9. In control means for a vehicle having a power unit, a clutch and a change speed mechanism including gear shift members operative to effect the passage from one speed ratio to another, an electromagnet for operating said clutch, and for producing a change of gears in the change speed mechanism, a plurality of electromagnets for selecting the gear shift member to be moved by said first mentioned electromagnet, an electric circuit for each of said electromagnets, switches disposed in said circuits, a control member, adapted to operate said switches, a screw threaded spindle connected to said control member, centrifugal masses driven at a speed proportional to the vehicle speed and operatively connected to said screw-threaded spindle to move said spindle and said control member to a position dependent on the vehicle speed, an accelerator member operatively connected to said screw-threaded spindle whereby the position of said control member is determined by the sum of the movements imparted to said member by the centrifugal masses and by said accelerator member, said switches being disposed angularly around the control member and adapted to be selectively actuated in accordance with the angular position of the control member, and a dash-pot connected to said clutch operating means and effective to progressively let in the clutch.

10. In control means for a vehicle having a power unit, a clutch and a change speed gear, including gear shift members operative to effect the passage from one speed ratio to another, an angularly movable control member controlling the operation of the clutch and of said gear shift members, a screw-threaded spindle connected to said control member, centrifugal masses driven at a speed proportional to the vehicle speed, said centrifugal masses being operatively connected to said spindle to move the spindle and the control member to a position dependent on the vehicle speed, an accelerator member operatively connected to said screw-threaded spindle whereby the position of said control member is determined by the sum of the angular movements imparted to said member by the centrifugal masses and by said accelerator member, an electromagnet for operating the clutch and for producing a change of gears in the change speed gear, a plurality of electromagnets for selecting the gear shift member to be moved by said first mentioned electromagnet, an electric circuit for each of said electromagnets, switches in said circuits and disposed angularly around the axis of rotation of said control member, said switches including rotatable carriers, and means on said carriers disposed in the path of movement of said control member, whereby said carriers are rotated to make and break said circuits upon angular movement of the control member produced by said centrifugal masses and by said accelerator member.

11. In control means for a vehicle having a power unit, a clutch and a change speed gear including gear shift members operative to effect the passage from one speed ratio to another, an angularly movable control member for controlling the operation of the clutch and of said gear shift members, a screw-threaded spindle connected to said control member, centrifugal masses driven at a speed proportional to the vehicle speed, said centrifugal masses being operatively connected to said spindle to move the spindle and the control member to a position dependent on the vehicle speed, an accelerator member operatively connected to said screw threaded spindle whereby the position of the control member is determined by the combined angular movements imparted to said member by the centrifugal masses and by the accelerator member, an electromagnet for operating the clutch and for producing a change of gears in the change speed gear, a plurality of electromagnets for selecting the gear shift members to be moved by said first mentioned electromagnet, an electric circuit for each of said electromagnets, switches in said circuits adapted to be actuated by said control member, said switches including rotatable carriers angularly disposed around the axis of rotation of the control members, a mercury tube mounted on each carrier, said mercury tube being provided with two pockets disposed at an angle one relative to the other, means on said carriers disposed in the path of movement of the control member and adapted to coact with said member whereby the carriers are rotated to make and break said circuits upon angular movement of said control members, and means on said mercury tubes for delaying the flow of mercury from one of said pockets to the other pocket upon rotation of the carrier.

12. In control means for a vehicle having a power unit, a clutch and a change speed gear including gear shift members operative to effect the passage from one speed ratio to another, an electromagnet for operating the clutch and the gear shift members, an electric circuit for said electromagnet, a movable control member for controlling the making and breaking of said circuit, centrifugal masses driven at a speed proportional to the vehicle speed, said centrifugal masses being operatively connected to said control member to move said member to a position dependent on the vehicle speed, an accelerator member operatively connected to said control member whereby the position of said control member is determined by the sum of the movements imparted to said member by said centrifugal masses and by said accelerator member, and connecting members operatively connecting said electromagnet with the clutch and with the gear shift members, said connecting members including cam actuated movement transmission mechanism capable of transmitting the electromagnetic effort with a substantially constant torque to the clutch and the gear shift members.

13. In control means for a vehicle having a power unit, a clutch and a change speed mechanism, electromagnetic means for operating the clutch and the change speed mechanism, an angularly movable control member for controlling the circuits of said electromagnetic means, a screw threaded spindle connected to said control member, centrifugal masses driven at a speed proportional to the vehicle speed and operatively connected to said screw threaded spindle to angularly move said spindle and said control member to a position dependent on the vehicle speed, an accelerator member controlling the working of the power unit, and a crank mechanism operatively connecting said accelerator member to said screw-threaded spindle whereby during a fraction of movement of the accelerator member the movement imparted by said member to the screw threaded spindle has the same direction than the movement imparted thereto by the centrifugal masses, and during another fraction of movement of the accelerator member the movement imparted to the screw-threaded spindle is opposite to that imparted to the spindle by the centrifugal masses.

14. In control means for a vehicle having a power unit, a clutch and a change speed mechanism including gear shift members operative to effect a passage from one speed ratio to another, an electromagnet for operating the clutch and producing a change of gears in the change speed mechanism, a plurality of electromagnets for selecting the gear shift member to be moved by said first mentioned electromagnet, an electric circuit for each of said electromagnets, an accelerator member controlling the working of the power unit, an automatically operated control member moved in accordance with the vehicle speed and with the position of said accelerator member for controlling the energization of said electromagnets, a series of switches disposed in said circuits and adapted to be automatically actuated by said control member, a second series of switches in said circuits adapted to be manually actuated, and a commutator adapted to connect either series of switches into said circuits and to disconnect the other series of switches from said circuits.

ERNEST ALPHONSE DERUNGS.